United States Patent [19]

Horiki et al.

[11] Patent Number: 4,822,650

[45] Date of Patent: Apr. 18, 1989

[54] MASKING MEMBER

[75] Inventors: Seinosuke Horiki, Midori; Reiji Makino, Minami, both of Japan

[73] Assignee: Nagoya Oilchemical Co., Ltd., Nagoya, Japan

[21] Appl. No.: 100,524

[22] Filed: Sep. 24, 1987

[30] Foreign Application Priority Data

| | | | |
|---|---|---|---|
| Sep. 30, 1986 | [JP] | Japan | 61-149583[U] |
| Sep. 30, 1986 | [JP] | Japan | 61-149585[U] |
| Feb. 20, 1987 | [JP] | Japan | 62-024313[U] |

[51] Int. Cl.[4] ............ B32B 1/02; B32B 3/26

[52] U.S. Cl. ............ 428/34.2; 428/40; 428/317.3; 428/343; 428/36.5; 118/505

[58] Field of Search ............ 428/40, 35, 304.4, 343, 428/317.3; 118/505, 504

[56] References Cited

U.S. PATENT DOCUMENTS

| | | | |
|---|---|---|---|
| 2,388,835 | 11/1945 | Duggan | 118/505 |
| 3,667,988 | 6/1972 | Horiki | 118/505 X |
| 4,764,421 | 8/1988 | Horiki et al. | 428/40 X |

*Primary Examiner*—Alexander S. Thomas

*Attorney, Agent, or Firm*—Cooper & Dunham

[57] ABSTRACT

A new masking member of a vessel type comprising a bottom, (a) wall(s) which extend(s) upwards from the perimeter of said bottom, a flange which is extended from the upper edge(s) of said wall(s), and an adhesive layer formed on the surface of said flange, with said masking member made of a thermoplastic foam, is presented in this invention. When said masking member is used, said masking member is attached by said adhesive layer to a part of the surface of an article which is necessary to be protected from a surface treatment. After said surface treatment, said masking member may be removed from said part of said article by heating and softening or by a hook.

22 Claims, 10 Drawing Sheets

MASKING MEMBER

BACKGROUND OF THE INVENTION

The present invention relates to a new masking member used to protect a part of an article from a surface treatment such as coating, plating, phosphatizing, vacuum evaporation and the like. More particularly, the present invention relates to a new masking member of a vessel type comprising a bottom, (a) wall(s) which extend(s) upwards from the perimeter of said bottom, a flange which is extended from the upper edge(s) of said wall(s), and an adhesive layer formed on the surface of said flange, with said masking member made of a thermoplastic foam.

In a case where a surface treatment is effected on the surface of an article, said surface of said article often has part(s) to be protected from said surface treatment. For instance, said surface of said article may have part(s) to which parts such as bolts, nuts, brackets, frames, is/are attached and said surface treatment layer may sometimes obstruct the firm attaching of said parts. Therefore, it is necessary to protect such part(s) by masking member(s) and then said surface treatment is effected on said surface of said article. After said surface treatment, said masking member(s) may be removed from said surface.

DESCRIPTION OF THE PRIOR ART

Hitherto, adhesive tape has been used as a masking member to protect a part of an article from a surface treatment, such as coating, plating, phosphatizing, vacuum evaporation and the like. Namely, the adhesive tape is attached to a part of an article to protect it from said surface treatment and after said surface treatment, said adhesive tape is removed from part of said article. Said part is not affected by said surface treatment since said part was covered with said adhesive tape during said surface treatment.

Nevertheless, said adhesive tape as a masking member has faults. In cases where the part to be protected from said surface treatment is wide, it is troublesome to attach adhesive tape to the part to be protected and remove said adhesive tape from said part since a number of strips of adhesive tape must be attached to said part to cover the whole part, and further, in cases where adhesive tape is subjected to heat, said adhesive tape may stick to said part due to heating and the removing of said adhesive tape becomes very diffcult.

Still further, adhesive tape attached to the part to be protected is buried in said surface treatment layer and it is very difficult to find said buried adhesive tape and, of course, it is very difficult to remove said buried adhesive tape.

An improved masking member has been also presented. Said improved masking member is a panel consisting of a thermoplastic foam having an adhesive layer on one side. Said masking member may be attached to a part of the surface of an article which is necessary to be protected from a surface treatment by said adhesive layer of said masking member. Said panel of said masking member may have a proper size corresponding to the part of said article which is necessary to be protected from said surface treatment. Therefore, the problem presented when a number of strips of adhesive tape attached to said part to cover the whole part, may be solved. Further, as said panel of said masking member may be thick, said masking member is not buried in said surface treatment layer and is easily found.

After said surface treatment, said masking member may be removed from the part to which said masking member has been attached by heating and softening or by a hook. Nevertheless, said adhesive layer of said masking member covers the whole part(s) of the side of said panel and said masking member may become firmly attached to said part to be protected. Therefore, said adhesive layer of said masking member may obstruct the smooth removing of said masking member.

SUMMARY OF THE INVENTION

Accordingly, an object of the present invention is to save trouble when the masking member is attached/-removed to/from said part(s) of the surface of the article which is necessary to be protected from a surface treatment.

According to the present invention, there is provided a masking member comprising a new masking member of a vessel type comprising a bottom (a) wall(s) which extend(s) upwards from the perimeter of said bottom, a flange which is extended from the upper edge(s) of said wall(s), and an adhesive layer formed on the surface of said flange, with said masking member made of a thermoplastic foam.

When said masking member is used, said masking member is attached by said adhesive layer to the part of the surface of the article which is necessary to be protected from a surface treatment.

The masking member is made of a thermoplastic foam, such as a polystyrene foam, a polyethylene foam, a polypropylene foam and the like and said body may be colored by a suitable color if desirable, for the purpose of selection of the specified masking member according to the part to be protected.

Said masking member may be protduced by vacuum forming from a sheet of a thermoplastic foam, the molding of expandable thermoplastic beads, and the like.

DETAILED DESCRIPTION

Figure 1:
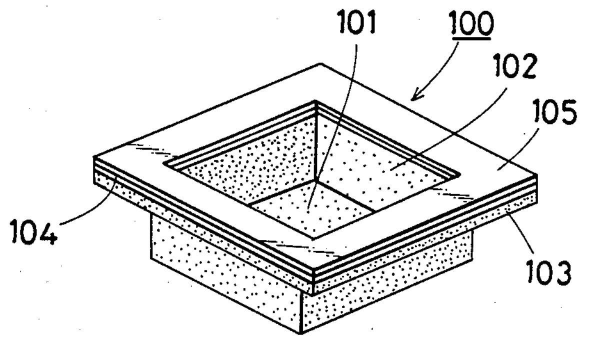
FIG. 1 is a perspective view of a first embodiment of the present invention.

FIG. 1 to FIG. 4 relate to a first embodiment of the present invention. Referring now to FIG. 1 to FIG. 4, a masking member (100) of a vessel type comprises a square bottom (101), perpendicular walls (102) which extend upwards from the perimeter of said bottom (101), a flange (103) which is extended from the upper edges of said walls (102), and an adhesive layer (104) formed on the surface of said flange (103), which said masking member (100) made of a thermoplastic foam such as polystyrene foam, a polyethylene foam, a polypropylene foam and the like. Said adhesive layer (104) is covered with a release sheet (105) such as a polyethylene film, a polypropylene film, a release paper and the like to prevent sticking to another article, the hands of workers and the like when the masking members are handled, one placed upon another, transported, and the like.

Said masking member (100) may be colored by a suitable color if desired, for the purpose of selection of the specified masking member according to the part to be protected.

Figure 2:
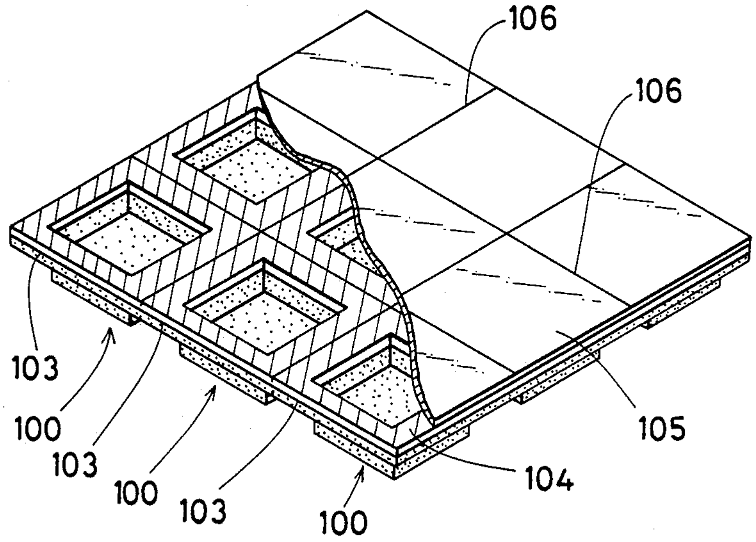
FIG. 2 is a perspective view of the first embodiment of the present invention in the case of said first embodiment being produced.

Said masking member (100) may be produced by vacuum forming from a sheet of a thermoplasic foam, the molding of expandable thermoplastic beads, and the like. Said masking member (100) may advantageously be produced by vacuum forming from a sheet of a thermoplastic foam such as a polystyrene paper and the like as shown in FIG. 2. Referring to FIG. 2, a number of masking members (100) are formed and arranged in rows and lines, and each masking member (100) is connected to the other masking member (100) by the flange (103). Cutting lines (106) are formed between said flange (103) and another said flange (103) and when said masking member (100) is used, said masking member (100) is torn along said lines (106) by hand. Said cutting lines (106) may be formed on the surface or(and) the under surface of said flange (103).

Figure 3:
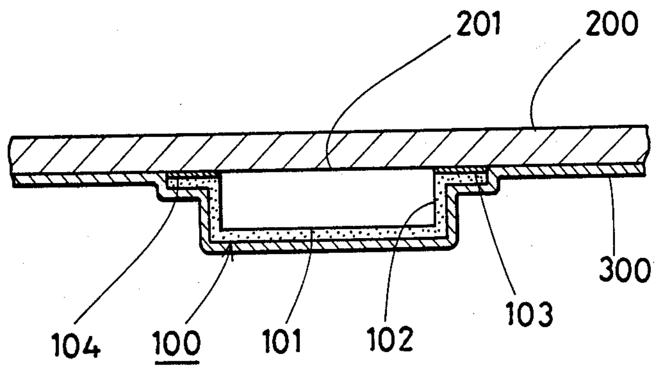
FIG. 3 is a partial side sectional view of the first embodiment of the present invention after surface treatment.
Figure 4:
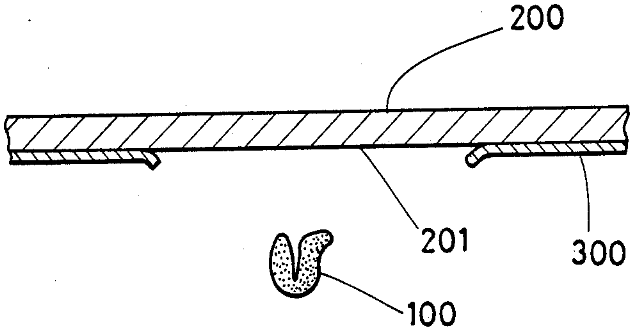
FIG. 4 is a partial side sectional view of the first embodiment of the present invention in the case of removing the masking member from the article.
Figure 5:
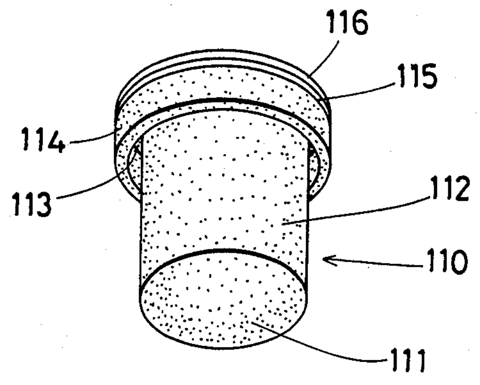
FIG. 5 is a perspective view of a second embodiment of the present invention.

Referring to FIG. 3, when said masking member (100) is uses, said release sheet (105) is removed from said adhesive layer (104) and said masking member (100) is then attached to a part (201) of the surface of an article (200) such as the underside of the floor of cars by said adhesive layer (104) thereof, which is necessary to be protected from a surface treatment such as coating, plating, phosphatizing, vacuum evaporation and the like. After said masking member (100) is attached to said part (201), said surface treatment is effected on the surface of said article (200) to form a film (300) of said surface treatment. Said part (201) of said surface of said article (200) is not subjected to said surface treatment since said part (201) is covered with said masking member (100). After said surface treatment, said surface-treated article (200) is heated to dry and/or cure if desired and in cases where the heating temperature is adequately higher than the softening point of the thermoplastic foam of said body (101) of said masking member (100), said masking member (100) will shrink by said heating and come off by itself from said part (201) of said surface of said article (200) as shown in FIG. 4. As said masking member (100) is of a vessel type, the volume of said shrunk masking member (100) may be much smaller than the apparent volume of the unshrunk masking member (100) and further, said masking member (100) is attached by only said adhesive layer (104) on the surface of said flange (103) thereof to said part (201) of said article (200), the removing of said masking member (100) from said part (201) of said article (200) may be very smooth without obstruction of said adhesive layer (104). Said masking member (100) may also be removed by a hook and, in this case, said masking member (100) may also be easily removed without obstruction of said adhesive layer (104).

FIG. 5 to FIG. 8 relate to a second embodiment of the present invention. In this embodiment, a masking member (110) vessel type comprises a ciruclar bottom (111), an inner perpendicular wall (112) which extends upwards from the circumference of said bottom (111), a flange (113) which is extended from the upper edge of said wall (112), and a outer perpendicular wall (114) which extends downwards from the perimeter of said flange (113), and an adhesive layer (115) formed on the surface of said flange (113), which said masking member (110) made of a thermoplastic foam the same as the first embodiment of the present invention. Said adhesive layer (115) is covered with a release sheet (116) the same as the first embodiment of the present invention.

Figure 6:
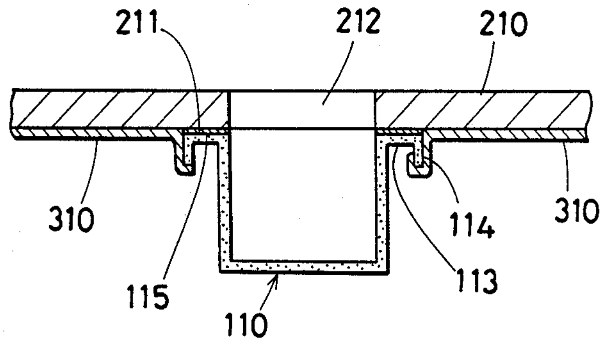
FIG. 6 is a partial side sectional view of the second embodiment of the present invention after surface treatment.
Figure 7:
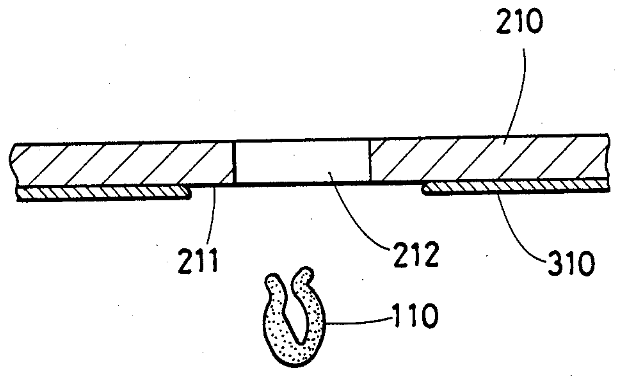
FIG. 7 is a partial side sectional view of the second embodiment of the present invention in the case of removing the masking member from the article.
Figure 8:
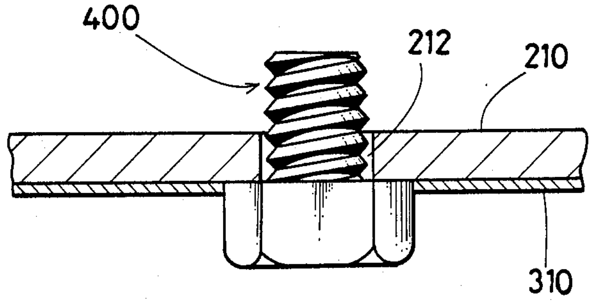
FIG. 8 is a partial side sectional view of the second embodiment of the present invention in the case where a bolt is inserted into a hole protected from a surface treatment.

When said masking member (110) is used, said release sheet (116) is removed from said adhesive layer (115) and said masking member (110) is then attached to a part (211) as shown in FIG. 6, of the surface of an article (210) by said adhesive layer (115) thereof, and said part (211) has a hole (212). After said masking member (110) is attached to said part (211), a surface treatment is effected on the surface of said article (210) to form a film (310) of said surface treatment. Said part (211) including said hole (212) is not subjected to said surface treatment since said part (211) is covered with said masking member (110) and said film (310) of said surface treatment may be cut by said outer perpendicular wall (114) of said flange (113) of said masking member (110). After said surface treatment, said surface-treated article (210) is heated to dry and/or cure if desired and in cases where the heating temperature is adequately higher than the softening point of the thermoplastic foam of said masking member (110), said masking member (110) will shrink by said heating and come off by itself from said part (211) of said surface of said article (21) as shown in FIG. 7. As said masking member (110) is of a vessel type the same as the first embodiment of the present invention, the volume of said shrunk masking member (110) may be much smaller than the apparent volume of the unshrunk masking member (110) and further, as above described, said film (310) as shown in FIG. 6, of said surface treatment may be cut by said outer perpendicular wall (114) of said flange (113) of said masking member (110), and said masking member (110) is also attached by only said adhesive layer (115) on the surface of said flange (113) thereof to said part (211) of said article (210) the same as the first embodiment of the present invention, the removing of said masking member (110) from said part (211) of said article (210) may be very smooth without obstruction of said film (310) and said adhesive layer (115) of said masking member (110). After said masking member (110) is removed from said part (211) as shown in FIG. 7, a bolt (400) is inserted into said hole (212) as shown in FIG. 8, and said bolt (400) may be firmly inserted into said hole (212) since said hole (212) and said part (211) located around the circumference of said hole (212) are not subjected to said surface treatment.

Figure 9:
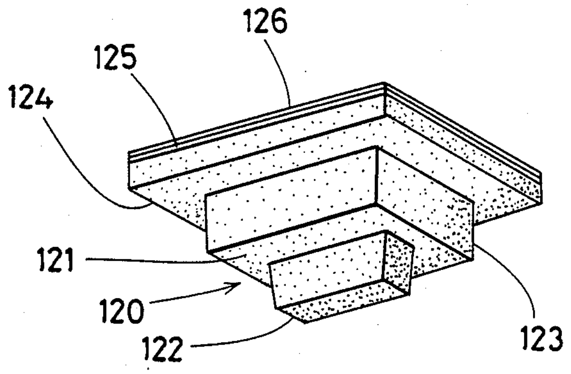
FIG. 9 is a perspective view of a third embodiment of the present invention.
Figure 10:
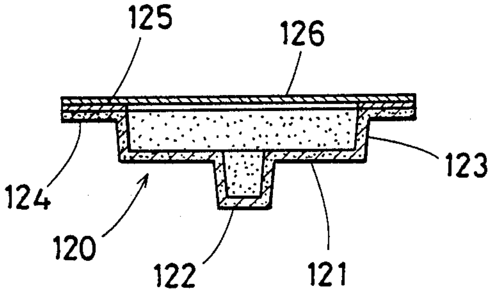
FIG. 10 is a side sectional view of the third embodiment of the present invention.
Figure 11:
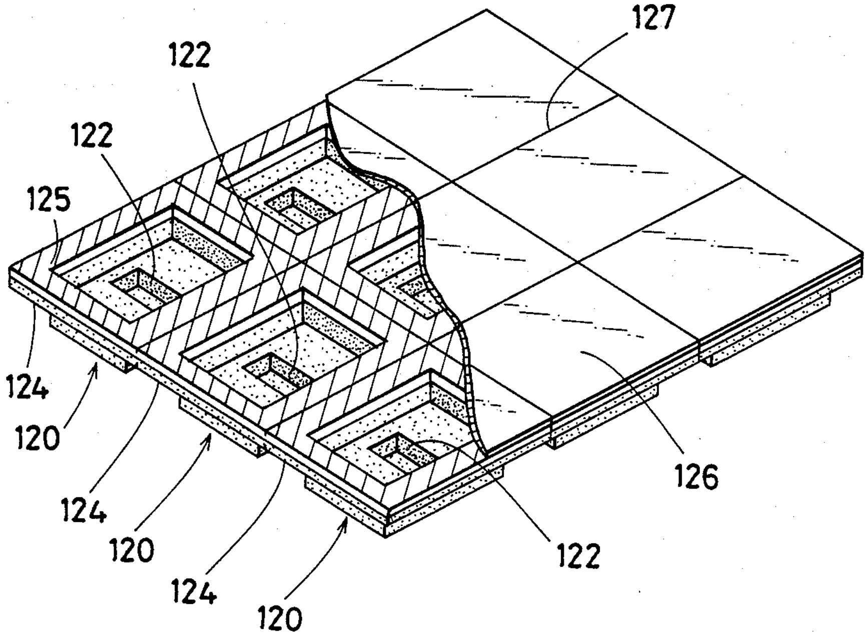
FIG. 11 is a perspective view of the third embodiment in the case of said third embodiment being produced.

FIG. 9 to FIG. 11 relate to a third embodiment of the present invention. In this embodiment, a masking member (120) of a vessel type comprises a rectangular bottom (121) from which a grip (122) is risen, perpendicular walls (123) which extend upwards from the perimeter of said bottom (121), a flange (124) which is extended from the upper edges of said walls (123), and an adhesive layer (125) formed on the surface of said flange (124), with said masking member (120) made of a thermoplastic foam the same as the first and second embodiments of the present invention, and said adhesive layer (125) is covered with a release sheet (126) the same as the first and second embodiments of the present invention. The masking member (120) of this embodiment is easily handled by holding said grip (122) of said masking member (120) when said masking member (120) is attached to a part of the surface of an article which is to be protected from a surface treatment and further, said masking member is easily removed by piercing said grip (122) of said masking member (120) with a hook.

Said masking member (120) may be advantageously produced by vacuum formaing from a sheet of a thermoplastic foam such as a polystyrene paper and the like the same as the first embodiment of this invention as shown in FIG. 2. Referring to FIG. 11, a number of masking members (120) are formed and arranged in rows and lines, and each masking member (120) is connected to the other masking member (120) by the flange (124). Cutting lines (127) are formed between said flange (124) and another said flange (124), and when said masking member (120) is used, said masking member (120) is torn along said lines (127) by hand. Said cutting lines (106) may be formed on the surface or(and) the under surface of said flange (103).

Figure 12:
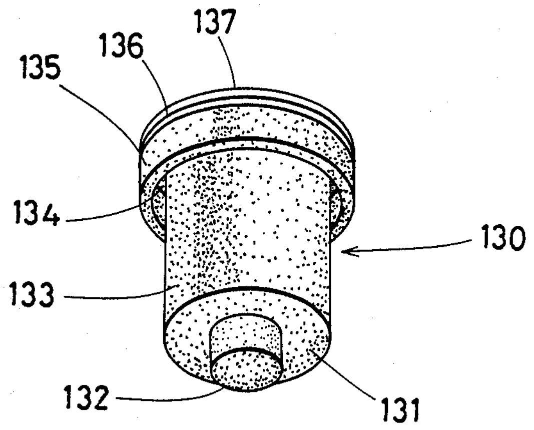
FIG. 12 is a perspective view of a fourth embodiment of the present invention.
Figure 13:
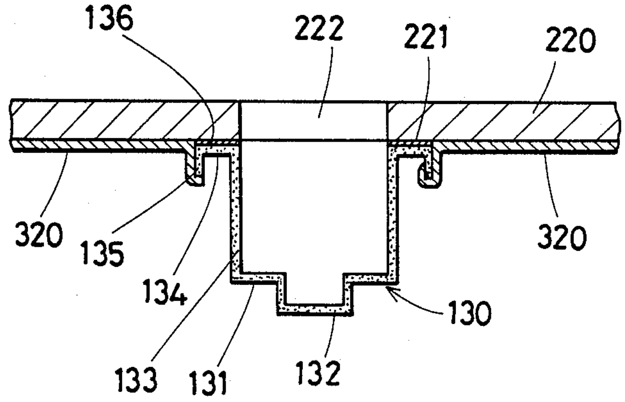
FIG. 13 is a partial side sectional view of the fourth embodiment of the present invention after surface treatment.
Figure 14:
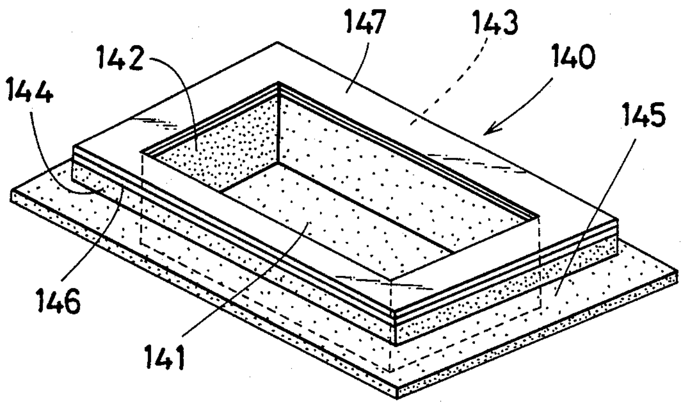
FIG. 14 is a perspective view of a fifth embodiment of the present invention.

FIG. 12 and FIG. 13 relate to a fourth embodiment of the present invention. In this embodiment, a masking member (130) of a vessel type comprises a circular bottom (131), from which a grip (132) is risen, an inner perpendicular wall (133) which extends upwards from the circumference of said bottom (131), a flange (134) which is extended from the upper edge of said wall (133), an outer perpendicular wall (135) which extends downwards from the perimeter of said flange (134), and an adhesive layer (136) formed on the surface of said flange (134) with said masking member (130) made of a thermoplastic foam the same as the first, second and third embodiments of the present invention, and said adhesive layer (136) is covered with a release sheet (137) the same as in the first, second, and third embodiments of the present invention.

The masking member (130) of this embodiment is easily handled by holding said grip (132) of said masking member (130) when said masking member (130) is attached to a part of the surface of an article which is to be protected from a surface treatment and further, said masking member (130) may be easily removed by piercing said grip (132) of said masking member (130) with a hook.

Said masking member (130) may be attached to a part (221) having a hole (222) in the surface of an article (220) which is to be protected from a surface treatment, and a film (320) of said surface treatment may be cut by said outer perpendicular wall (135) of said flange (134) of said masking member (130) the same as in the second embodiment of the present invention, as shown in FIG. 12 and said msaking member (130) is also attached by only said adhesive layer (136) on the surface of said flange (134) thereof to said part (221) as shown in FIG. 13, of said article (220) the same as the first, second and third embodiments of the present invention, the removing of said masking member (130) from said part (221) may be very smooth without obstruction of said film (320) and said adhesive layer (136) of said masking member (130).

FIG. 14 to FIG. 17 relate to a fifth embodiment of the present invention. In this embodiment, a masking member (140) of a vessel type comprises a rectangular bottom (141), inner perpendicular walls (142) which extend upwards from the perimeter of said bottom (141), an upper flange (143) which is extended from the upper edges of said walls (142), outer perpendicular walls (144) which extend downwords from the perimeter of said upper flange (143), a lower flange (145) which is extended from the lower edges of said outer walls (144), and an adhesive layer (146) formed on the surface of said upper flange (143) with said masking member (140) made of a thermoplastic foam the same as the first, second, third, and fourth embodiments of the present invention, and said adhesive layer (146) is covered with a release sheet (147) the same as the first, second, third and fourth embodiments of the present invention.

Figure 15:
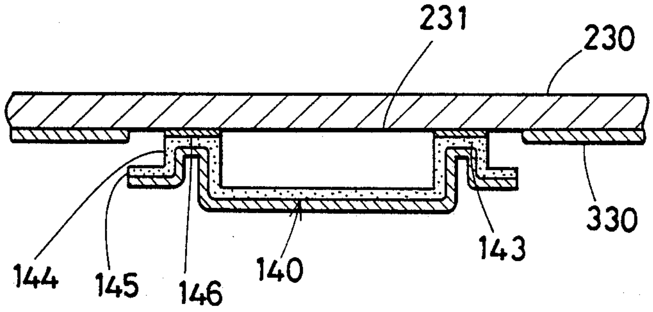
FIG. 15 is a partial side sectional view of the fifth embodiment of the present invention after surface treatment.
Figure 16:
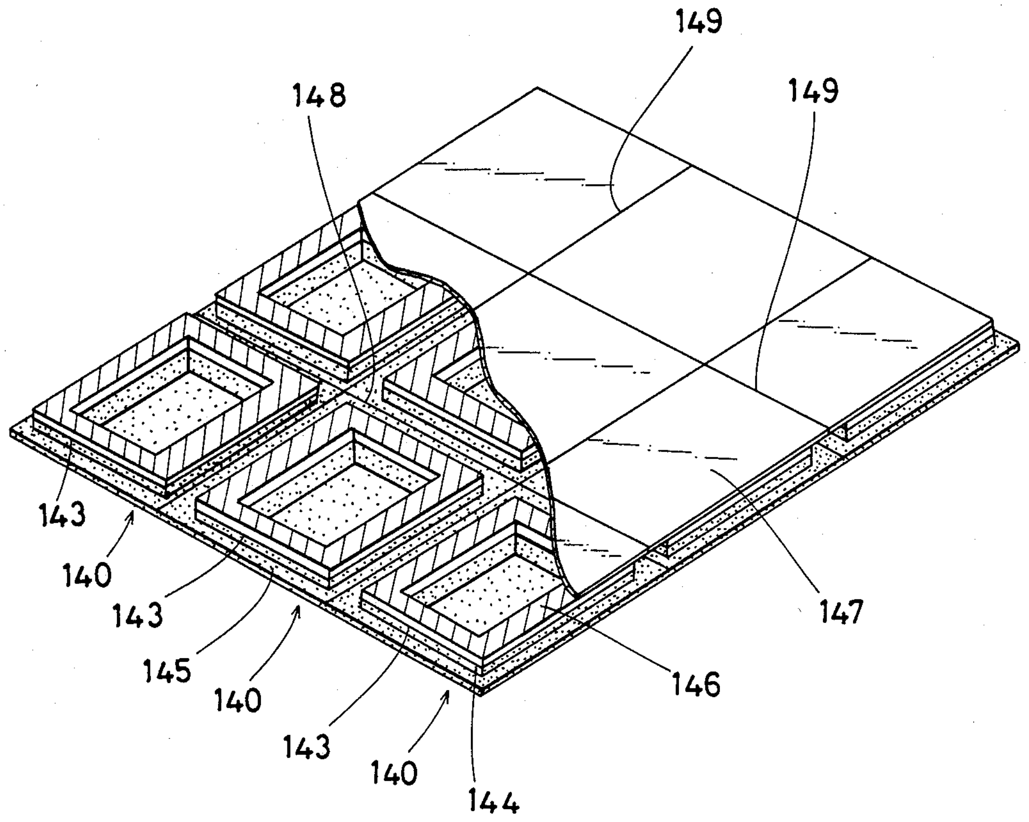
FIG. 16 is a perspective view of the fifth embodiment of the present invention in the case of said fifth embodiment being produced.

The masking member (140) may be attached to a part (231) of the surface of an article (230) which is to be protected from a surface treatment, and a film (330) of said surface treatment may be more completely cut by said lower flange (145) of said masking member (140) than in the cases of the second and fourth embodiments of the present invention since said lower flange (145) of said masking member (140) covers and protects the perimeter of said part (231) of the surface of said article (230) from said surface treatment as shown in FIG. 15. Therefore, the removing of said masking member (140) from said part (231) may be more smooth than in the cases of the second and fourth embodiments of the present invention. Further, said masking member (140) may be advantageously be produced by vacuum forming from a sheet of a thermoplastic foam such as a polystyrene paper and the like as shown in FIG. 16 the same as in the first and second embodiments of the present invention. Referring to FIG. 16, a number of masking members (140) are formed and arranged in rows and lines, and each masking member (140) is connected to the other masking member (140) by the lower flange (145). Cutting lines (148) are formed between said lower flange (145) and another said lower flange (145) and cutting lines (149) are also formed in said release sheet along said cutting lines (148) of said lower flange (145). Said cutting lines (106) may be formed on the surface or(and) the under surface of said flange (103).

Figure 17:
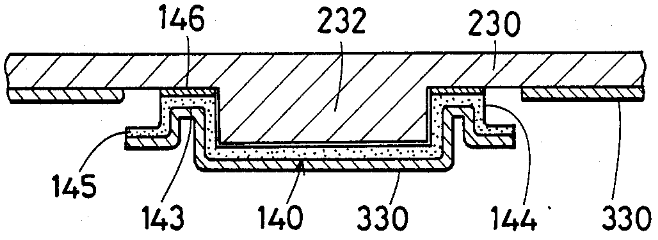
FIG. 17 is a partial side sectional view of another fifth embodiment of the present invention.

When said masking member (140) is used, said masking member (140) is torn along said lines (148) and (149) by hand. Still further, the masking member (140) may be also used to cover a projection (232) on the surface of an article (230) which is to be protected from a surface treatment as shown in FIG. 17.

Figure 18:
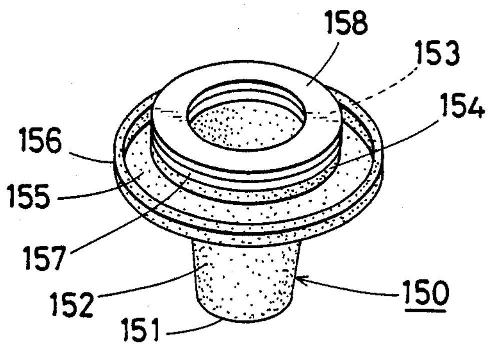
FIG. 18 is a perspective view of a sixth embodiment of the present invention.
Figure 19:
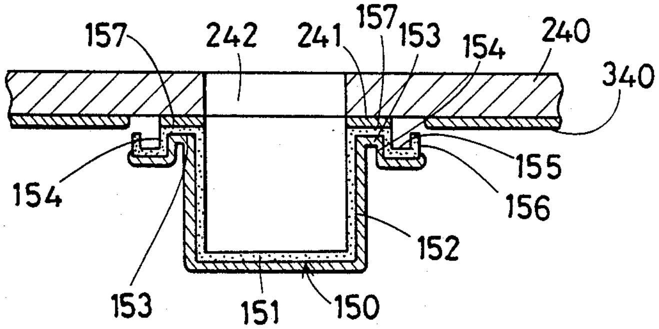
FIG. 19 is a partial side sectional view of the sixth embodiment of the present invention after surface treatment.

FIG. 18 and FIG. 19 relate to a sixth embodiment of the present invention. In this embodiment, a masking member (150) of a vessel type comprises a circular bottom (151), an inner perpendicular wall (152) which extends upwards from the circumference of said bottom (151), an upper flange (153) which is extended from the upper edge of said wall (152), a middle perpendicular wall (154) which extends downwards from the circumference of said flange (153), a lower flange (155) which is extended from the lower edge of said middle perpendicular wall (154), an outer perpendicular wall (156) which extends upwards from the circumference of said flange (155), and an adhesive layer (157) formed on the surface of said upper flange (153) with said masking member (150) made of a thermoplastic foam the same as the first, second, third, fourth and fifth embodiments of the present invention, and said adhesive layer (157) is covered with a release sheet (158) the same as the first, second, third, fourth and fifth embodiments of the present invention.

The masking member (150) may be attached to a part (241) having a hole (242) in the surface of an article (240) which is to be protected from a surface treatment, and a film (340) of said surface treatment may be still more completely cut by said lower flange (155) and said outer perpendicular wall (156) than in the case of the fifth embodiment of the present invention since the circumference of said part (241) may be covered with both said lower flange (155) and said outer perpendicular wall (156) to protect said circumference of said part (241) from said surface treatment as shown in FIG. 19. Therefore, the removing of said masking member (150) from said part (241) may be more smooth than in the cases of the prior embodiments of the present invention.

The masking member of the present invention should have a suitable form according to the part to be protected from a surface treatment.

We claim:

1. A thermoplastic foam vessel shape masking member comprising a bottom, a wall extending upwardly from the perimeter of said bottom, a flange extending outwardly from the upper edge of said wall and an adhesive layer formed on the upper surface of said flange.

2. A masking member of claim 1, wherein said masking member is made of polystyrene foam.

3. A masking member of claim 1, wherein said masking member is produced by vacuum forming from a sheet of a thermoplastic foam.

4. A masking member of claim 1, wherein said masking member is produced by vacuum forming from a polystyrene paper.

5. A masking member of claim 1, wherein said adhesive layer is covered with a release sheet.

6. A masking member in accordance with claim 1 wherein a grip is provided extending from the outside of said bottom.

7. masking member in accordance with claim 1 wherein said wall extending upwardly from the perimeter of said bottom is an inner wall and wherein an outer wall is provided extending downwardly from the perimeter of said flange.

8. A masking member of claim 7, wherein a projection grip is provided outwardly from the outside said bottom.

9. A masking member of claim 7, wherein said masking member is made of polystyrene foam.

10. A masking member of claim 7, wherein said masking member is produced by vacuum forming from a sheet of a thermoplastic foam.

11. A masking member of claim 7, wherein said masking member is produced by vacuum forming from polystyrene paper.

12. A masking member of claim 7, wherein said adhesive layer is covered with a release sheet.

13. A masking member in accordance with claim 1 wherein said wall which extends upwardly from the perimeter of said bottom is an inner wall, wherein said flange which extends from the upper edge of said inner wall is an upper flange, wherein an outer wall extends downwardly from the perimeter of said upper flange and wherein a lower flange extends from the lower edge of said outer wall.

14. A masking member of claim 13, wherein said masking member is made of polystyrene foam.

15. A masking member of claim 13, wherein said masking member is produced by vacuum forming from a sheet of a thermoplastic foam.

16. A masking member of claim 13, wherein said masking member is produced by vacuum forming from a polystyrene paper.

17. A masking member of claim 13, wherein said adhesive layer is covered with a release sheet.

18. A masking member in accordance with claim 1 wherein said wall which extends upwardly from the perimeter of said bottom is an inner wall, wherein said flange which extends outwardly from the upper edge of said inner wall is an upper flange, wherein a middle wall extends downwardly from the perimeter of said upper flange, wherein a lower flange extends outwardly from the lower edge of said middle wall and wherein an outer wall extends upwardly from said lower flange.

19. A masking member of claim 18, wherein said masking member is made of polystyrene foam.

20. A masking member of claim 18, wherein said masking member is produced by vacuum forming said a sheet of a thermoplastic foam.

21. A masking member of claim 18, wherein said masking member is produced by vacuum forming from a polystyrene paper.

22. A masking member of claim 18, wherein said adhesive layer is covered with a release sheet.

* * * * *